Nov. 9, 1954  A. J. A. FAVRE  2,693,908
APPARATUS FOR THE ANALYSIS OF A RECORD AND
THE INDICATION OF THE CORRELATION FACTOR
Filed Aug. 26, 1947
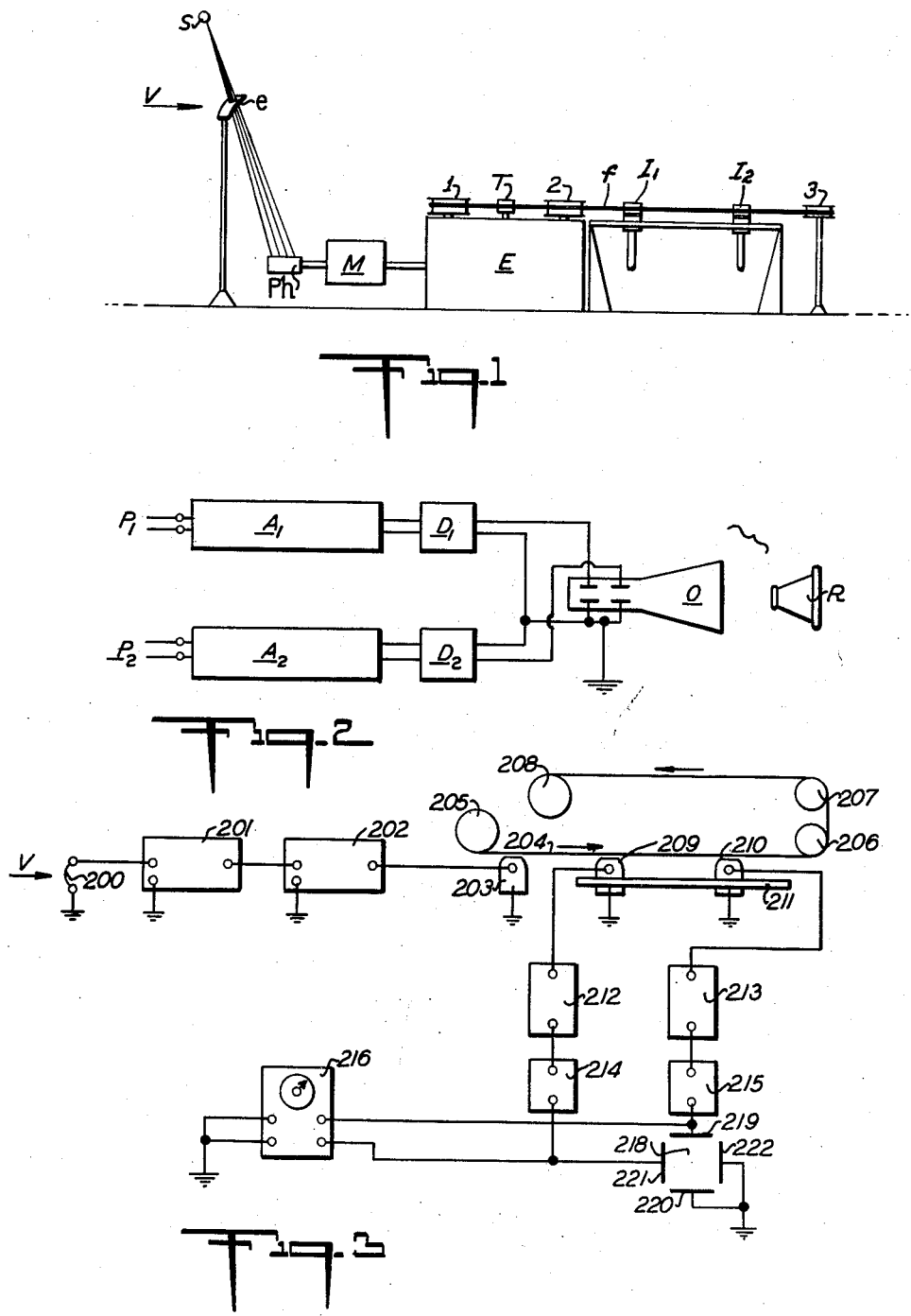

United States Patent Office 2,693,908
Patented Nov. 9, 1954

2,693,908

APPARATUS FOR THE ANALYSIS OF A RECORD AND THE INDICATION OF THE CORRELATION FACTOR

Alexandre Jean Auguste Favre, Marseilles, France, assignor to Office National d'Etudes et de Recherches Aeronautiques, Paris, France Application August 26, 1947, Serial No. 770,648

Section 1, Public Law 690, August 8, 1946
Patent expires March 9, 1966

9 Claims. (Cl. 235—61)

My invention has for its object to provide apparatus for effecting the statistical measuring of a correlation at spaced intervals of time, and which is also applicable to the measuring of various statistical elements relating to contingent magnitudes of which the different values at different moments are to be compared.

This apparatus is also applicable to statistical measures relating to several contingent magnitudes, or to a single contingent magnitude considered under various conditions; said magnitudes being compared at different time intervals so as to indicate correlation in time and space.

The apparatus according to my invention converts the contingent phenomenon or phenomena to be considered into an immediately perceptible phenomenon the direct observation of which will allow the definition of statistical factors.

In apparatus embodying the invention:

(a) The phenomenon to be studied has a quantitative influence on a measuring instrument the indications of which are provided by the values of a characteristic property of an electric current or a beam of light.

(b) The characteristic property of the electric current or luminous beam is recorded on a diagram unwinding as a function of time.

(c) The recording is reproduced simultaneously on several different sections of the diagram.

(d) These reproductions that are constituted by electric currents or luminous fluxes are associated together statistically and this combination when it becomes apparent allows measuring the desired statistical results.

My invention covers in particular an apparatus in which the phenomenon to be studied is converted into an electric current; the current is then recorded on a record made of metal, that unwinds continuously as a function of time after which two simultaneous reproductions are performed at two points of the record that are distant from one another and located on the downstream side of the recording point, whereby electric currents are produced of which one corresponds to the phenomenon considered at a first predetermined moment while the other relates to the same phenomenon considered at a moment different from the former after which one of the currents is applied to one pair of plates of a cathode ray oscillograph while the other current is applied to the other pair of plates of said oscillograph.

I obtain thus on the oscillograph screen a statistical spot area that it is possible to photograph, to investigate through a microphotometer and of which it is possible to measure the geometrical size, such measurements allowing ascertaining the desired statistical elements, for instance the coefficient of correlation that is delayed in time, through application of known mathematical formulae.

In a modification allowing a direct measuring of statistical elements, for instance that of the coefficient of correlation; the two reproduction currents are associated so as to form their product in an apparatus of known type adapted to provide said product, for example, in a damped electro-dynamometer or a damped wattmeter. Through a suitable selection of the amount of damping, there may be obtained directly a measure of the desired element and it is possible to study microscopically small variations thereof.

My invention covers also:

(A) An embodiment of the invention wherein the time-shifting between simultaneous reproductions is adjustable, said reproductions corresponding consequently to phenomena considered at different and adjustable time intervals.

(B) A further embodiment according to which there are recorded on a single record electric currents or fluxes or the like relating to different phenomena.

(C) A further modification according to which there are executed on the same diagram several recordings relating to the same phenomenon, the records being executed under different conditions.

The recording means for obtaining a recording of the phenomenon or phenomena to be studied may be selected advantageously among those used in the art for recording sounds, such as wax engraving means, plastic material engraving means, a photographic arrangement similar to that used for sound reproducing with the usual sound films, magnetic means and the like.

It has been found most advantageous to use an arrangement for magnetic recording of the type disclosed by Poulsen as far back as 1898 and improved since by numerous inventors. It should be remembered that this arrangement includes a metal wire or a metallic strip or a strip carrying magnetic filings that moves at a uniform speed inside a magnetic field controlled by the electric current to be recorded. The magnetization produced in the metal corresponds thus to the different values of the current to be recorded. The reproduction is obtained by causing the magnetic diagram thus provided to pass in the vicinity of an electric circuit that forms then the seat of induced currents which reproduce the recorded current.

The recording device arrangement includes to advantage means for producing a sinusoidal carrier wave that is amplitude or frequency modulated by the current to be recorded. The reproducing current is then demodulated after amplification and the original current is obtained again that corresponds directly to the phenomenon.

In using apparatus embodying the invention, the recording may be executed with a record advancing at a predetermined speed and the reproduction is executed by means of said record but moving at a speed different from the former. Through such means I obtain either or both of the following results:

The frequency of the carrier waves of the reproduction or reproductions that is different from that of the carrier waves used in the recording.

An automatic amplification through an increase of the derivative of the magnetic field as a function of time.

In order that the invention may be fully understood, illustrative embodiments thereof are hereinafter described in detail, merely by way of example and with reference to the accompanying drawing, which forms a part hereof, and wherein:

Fig. 1 is a schematic view showing a portion of apparatus constructed in accordance with the present invention;

Fig. 2 is a wiring diagram of the remainder of the embodiment of Fig. 1; and

Fig. 3 is a schematic view and wiring diagram of another embodiment of the invention.

As shown in Fig. 1, the luminous source S produces a luminous beam S' of predetermined characteristics adapted to cooperate with the screen e. Said screen is made of flexible material and is constituted for instance by a blackened opaque sheet of mica that assumes a general rectangular shape and is held along one edge through a stationary stand e'. This flexible screen is positioned in a stream of a turbulent fluid the speed of which is given out by the vector V and of which it is desired to study a component $u$ ($t$) at the point occupied by the screen $e$, compared to itself with a $dt$ delay. Beyond the screen $e$, the beam S' impinges on a photocell Ph.

The screen $e$ located in the fluid current is deformed in conformity with a function of the speed of the latter and it cuts off a more or less considerable fraction of the luminous beam S'. The luminous flux received by the photocell Ph and consequently the electric current passing through said cell depends, for a predetermined shape of the screen $e$, on the studied component of speed of the fluid.

This gives an arrangement already known as the Faille-Taz photocell anemometer and which is fully described in "Compte Rendu de l'Académie des Sciences, T 206, p. 358, Paris, Janvier 1938 (Gauthier, Villars Edit. Paris).

To the same purpose, it is possible to use in my apparatus a hot wire anemometer as disclosed by Dryden (N. A. C. A. Report 581, page 5, 1937 by H. L. Dryden, G. B. Schubauer, W. C. Mock, J. and H. K. Skramstad "N. B. S.") or as described in: "Les appareils à fil chaud, leurs applications dans la Mécanique expérimentale des fluides" by E. G. Richardson, Gauthier, Villars, Edit. Paris 1934."

It is also possible to use an ionic sounding apparatus and generally speaking any measuring system suiting the phenomena to be studied and that transforms the desired measure into an electrical current or a luminous flux.

With a combination of several elementary systems, it is possible to study as several components of the speed, as will be described in greater detail hereinafter.

The current passing through the photocell $Ph$ forms the modulating current of a carrier current the frequency of which may range for instance between 2,000 and 3,000 cycles. The modulation of the carrier current is performed in the modulator M of standard type. The carrier current may be modulated as to amplitude or as to frequency. Among the conventional methods of radio-electric technique, I have applied advantageously to this purpose anodic modulation through modification of the anodic voltage of a triode as produced at the rhythm of low frequency oscillations provided as disclosed hereinabove by the phenomenon to be studied.

The modulated current passing out of the modulator M is then recorded in a magnetic recording device carrying the general reference character E. Such a magnetic recording device may be of the kind referred to in United States Letters Patent No. 2,378,388.

In the drawing, I have illustrated diagrammatically a steel wire $f$ moving over and between two drums 1 and 2 that are rotated respectively by two motors for winding and unwinding it. Between the two drums, the wire $f$ is submitted to the action of a recording head T that includes as known per se an arrangement for the preliminary wiping out of any possible prior recording together with a second arrangement adapted to produce a further recording. Said latter arrangement includes a coil through which may flow a current from the modulating device M after amplification while a gap is provided therein through which the steel wire $f$ progresses at a constant speed. The induced magnetic field that is proportioned to said current magnetizes also in a proportional manner the portion of the wire lying in the gap and said wire retains a magnetization corresponding thus to the current to be recorded. As well known and stated hereinabove, the wire may be replaced by a metal strip or a strip carrying a magnetic powder, etc.

The wire $f$ carries thus throughout at least part of its length a record of the phenomenon to be studied. The record on two different sections of the wire corresponds to the characteristics to be studied (in the present case a speed component) of the phenomenon at time intervals separated by an interval $\delta t$ equal to the time required for the wire to progress in front of the recording head by a wire length equal to the distance between said two sections.

The wire carrying this infinity of records passes then inside the reproduction device; it passes first in front of a first reading head $I^1$, then in front of second reading head $I^2$. These heads are similar in their constitution to the recording device and are well known per se. Each head is slidingly carried on a carrier $g$ that is preferably graduated so that it is possible to adjust the distance $\delta l$ between said reading heads. The passage of the wire through the gap provided in the head $I^1$ induces in the latter an electric current that reproduces, except for an amplifying factor or the introduction of a carrier wave, the current passing through the photocell $Ph$ at the moment when the wire section considered passes through the recording head T. At the same moment and similarly, the passage of the wire through the gap in the reading head $I^2$ induces in the latter an electric current that, except for an amplification factor and the incorporation of a carrier wave, reproduces the current that has passed through the photocell $Ph$ at the moment when the wire section considered has passed in register with the recording head T. In brief the reading heads $I^1$ and $I^2$ derive readings in the form of electric currents which define the phenomenon to be studied as it appears at time intervals that differ from one another by the time elapsed between the passage through the recording head T, of the section positioned at the moment considered in register with the reading head $I^2$ and the passage through the recording head T of the section positioned at the moment considered under the reading head $I^1$.

The adjustment of the distance between the reading heads $I^1$ and $I^2$ allows selecting as desired said lagging or delay or time interval $\delta t$.

The pulley 3 is mounted loose and provides for the return of the wire $f$ to the drums 1 and 2.

In the simplest embodiment of the invention, the speed of progression of the wire in register with the recording head T is the same as the speed of progression of the wire in register with the reading heads $I^1$ and $I^2$.

In a modification, the speed of progression of the wire through the heads $I^1$ and $I^2$ differs from the speed of passage through the recording head T. In this modification the reproduction step is obviously not simultaneous with the recording step. It is thus possible to obtain reproductions with carrier waves, the frequency of which differs from that of the recording carrier waves. It is also possible to obtain in this manner an automatic amplification through an increase in the derivative of the magnetic field with reference to time.

The reproduction current induced in the head $I^1$ passes through an amplifier A1 and the reproduction current passing out of the head $I^2$ feeds an amplifier A2 (Fig. 2). These amplifiers are for instance of the type including low frequency vacuum tubes feeding but little power and having a high voltage amplifying ratio. The current passing out of the amplifying device A1 passes then through a detector or demodulator D1 and the current passing out of the amplifying device A2 passes through a detector or demodulator D2. These detectors are of a conventional type and may include a power amplifying tube feeding, through the agency of a transformer, diodes adapted to rectify the modulated oscillations according to the well known wiring diagram operating on both half-periods, while a filter is adapted to separate the low frequencies corresponding to the phenomenon to be studied from the double frequency and harmonic components from the oscillator.

The current passing out of the detector D1 is sent to the vertical plates of a cathode ray oscillograph O and the current passing out of the detector D2 is sent into the horizontal plates of said oscillograph or vice versa.

There appears on the screen of the oscillograph a statistical image that is described by the luminous spot the location of which on the screen in a system of rectangular coordinates is defined by abscissae proportional to the current passing out of the detector D1 while the ordinates are proportional to the current passing out of the detector D2.

A photographic apparatus R is positioned in front of the oscillograph so as to allow photographing the screen of the latter. The photographing of said screen with a very short exposure shows the spot travels along a highly irregular path. In contradistinction, if a photograph is executed with a long exposure (i. e. that is long with reference to the frequency of the fluctuations in the phenomenon observed) there is obtained a statistically distributed image allowing a measuring of the main parameters sought for.

It is thus possible to draw by studying of said photographs the regression straight, the regression line, the curves of equal frequenceis and also to measure the dispersions, the coefficient of correlation and correlation ratios, etc. relating to the registered contingent magnitude.

The mathematical definition of the coefficient of correlation may be found in the following works:

G. I. Taylor, "Théorie statistique de la turbulence" Proc. of the Roy. Soc., 2 Sept. 1935, vol. 151.

H. L. Dryden Rapport N. A. C. A. No. 581 (référence citée, 1°).

Th. Von Karman, "Les fondements de la théorie statistique de la turbulence," Journ. Aero. Sci., vol. 4 Février 1937.

Th. Von Karman, "Sur la théorie statistique de la turbulence isotrope."

L. Howarth, Proc. Roy. Soc. London, 1938.

Simply stated, the coefficient of correlation between two aleatory variables indicates the relation of probability between them. It is an average value over a very long period of time, of (or proportional to) the product of the two variables under consideration. From another standpoint, the coefficient of correlation may be regarded as cognate with the quantity known in analysis as the differential quotient. In analytical geometry, it is well-known that the differential quotient may be represented as the slope of the tangent to a curve; where however the variations of a variable cannot be represented by a curve—as is the case with an aleatory or haphazard process—but are represented rather by a multiplicity of points scattered over a certain area, then the concept of the differential quotient vanishes and is superseded by that of the coefficient of correlation.

The correlation coefficient with reference to time, in the usual case where the phenomenon studied conforms with Gauss' law, may be obtained by measuring the ratio $a/b$ between the axes of the ellipses, which are the curves of equal luminous densities, obtained on the photographs through the formula:

$$r = \frac{(a/b)^2 - 1}{(a/b)^2 + 1}$$

It is also possible to define the frequency of passage of the luminous spot through a point of the screen by measuring the luminous density corresponding thereto as recorded on a photographic plate. It is possible to use to this purpose a conventional micro-photometer that allows defining the curve of equal luminous densities on the photographs so as to obtain starting therefrom the curves of equal densities which allow measuring the co-efficient of correlation.

It is also possible to define directly a statistical parameter by providing for the multiplication between the electric reproduction currents through the agency of electrical devices such as a damped wattmeter or a damped dynamometer fed with both currents.

Another embodiment of the invention will be described, related to the determination of the time delayed coefficient of correlation in the case of the turbulent gas-flow in a blast system. An obstacle, such as a set of grate bars, is interposed in the path of flow of the blast; the presence of this obstacle causes turbulence beyond it in the stream. The receiver member of an anemometer is placed byond the obstacle. In one practically constructed and tested form of embodiment, the receiver member is a Dryden hot wire. It will be recalled that such a Dryden anemometer comprises a very fine platinum wire, a few microns in diameter, and about 1 mm. in length, electrically heated by a flow of current under constant voltage or with a constant amperage. This hot wire interposed in a jet of gas is cooled by convection under the motion of the surrounding fluid medium. As the electric resistance of the wire depends on its temperature, the voltage or current undergoes fluctuations which correspond to, and may serve to indicate, the fluctuations in velocity of the fluid. According to the invention, these current variations are recorded on a moving recording medium, from which readings are subsequently obtained at two different points thereof, and these readings statistically combined.

Referring in detail to Fig. 3, the hot wire 200 of a Dryden anemometer is placed in a turbulent fluid for which it is desired to measure the delayed or displaced coefficient of correlation corresponding to a component of the velocity diagrammatically indicated at V.

The current output from the anemometer is fed through an amplifier 201 and the amplified current is applied to a recording device 202. This device comprises a recording head 203 which produces a record upon a recording tape 204 fed from a drum 205 over rollers 206 and 207 to a take-up drum 208. The resulting record, beyond the head 203, is fed past two translating or read-out heads 209, 210, mounted for sliding adjustment on a calibrated support 211.

The read-out current from both read-out heads are amplified in amplifiers 212 and 213 and de-modulated in de-modulators 214 and 215, and are then statistically combined, for instance in a damped electro-dynamometer 216, the movable member 217 of which is adapted to indicate directly the coefficient of correlation. Mounted in parallel with the damped electro-dynamometer or wattmeter 216 is a control oscillograph 218. One pair of the deflector plates 219—220 of this oscillograph is fed with current from the read-out head 210, after amplification and de-modulation thereof; the other set of plates 221—222 is fed with the current output from the other read-out head.

The above-described apparatus will provide a measurement of the delayed or time-displaced correlation coefficient and makes it possible, for example, to investigate the variations of this coefficient as a function of the velocity of the gaseous jet ahead of the obstacle, or as a function of the distance from the said obstacle to the receiver element of the anemometer (hot wire 200 in this example), or further as a function of the shape of the grate bars forming the obstacle, and so forth.

The "delay" or "displacement" factor serving to define the coefficient of correlation may be varied simply by varying the spacing between the read-out heads 209 and 210, by altering their sliding adjustment on the support 211.

The method according to the invention allows measuring statistical parameters that introduce a comparison between different times and it is applicable to investigations of the most varied types and more particularly inter alia: the turbulence in aerodynamic fluids, atmospheric turbulence, hydraulic turbulence, applications of probability calculus and statistics, physics, meteorology, chemistry, biology, agriculture, medicine, political economy and the like and generally speaking all investigations requiring the use of statistics.

For instance, a recording of the encephalic current generated by the human brain shows disordered, haphazard variations. But a coefficient of correlation delayed or displaced in time may be connected with it and this coefficient may be measured as described in the application. The same applies to stock-exchange quotations of a given item or class of items, which vary in an apparently disordered or haphazard way.

I claim:

1. In a record analyzing system: a support having a density record thereon, first and second reading heads co-operating with said record for converting the record into signals and spaced apart along said record so that the signals derived simultaneously by said heads represent a time delay, single indicating means having two inputs sensitive to said signals, and first and second channels connecting respectively the first reading head to one input and the second reading head to the other input for applying said signals to said indicating means.

2. In a record analyzing system: a support having a density record thereon, first and second reading heads co-operating with said record for converting the record into signals and spaced apart along said record so that the signals derived simultaneously by said heads represent a time delay, double input indicating means for supplying a single indication as a function of said signals derived from both said reading heads, and first and second channels connecting each of said reading heads to one of the inputs of said indicating means.

3. A system for statistical analysis of a record of an aleatory event comprising a support having a density record of the event thereon, first and second reading heads cooperating with the support for obtaining two readings of the record, said heads being spaced apart along said record so that the readings simultaneously derived by said heads represent a time delay, double-input means for supplying a single indication as a function of both readings, and first and second channels connected respectively to the reading heads and the inputs, said means having a degree of inertia adapted to impart a desired statistical character to said indication.

4. Device for determining a statistical factor relating to at least one quantity varying at random; comprising a recording of at least said one quantity, a first reading head and a second reading head in reading relationship with the recording and spaced apart along the latter so that a time delay exists between the portions of said recording being simultaneously read by said heads, indicating means having two inputs sensitive to the readings derived by said heads and having a degree of inertia corresponding to the statistical factor to be determined, a first channel between said first head and one of said inputs for supplying the reading of said first head to said one input, and a second channel from said second head to the other of said inputs for supplying the reading of said second head to said other input.

5. Device for determining a statistical factor relating to a quantity varying at random; comprising a recording of said quantity having a variable density, a first reading head and a second reading head in reading relationship with the recording and spaced apart along the latter so that a time delay exists between the portions of said recording being simultaneously read by said heads, indicating means having two inputs sensitive to the readings derived by said heads and having a degree of inertia corresponding to the statistical factor to be determined, a first channel between said first head and one of said inputs for supplying the reading of said first head to said one input, and a second channel from said second head to the other of said inputs for supplying the reading of said second head to said other input.

6. A device for analysing the recording of a phenomenon to determine a statistical factor relating to said phenomenon; said device comprising a recording support, a single density recording track on said support, means for continuously moving said support, a first reading head in reading cooperation with said track, a second reading head in reading cooperation with said recording track at a section of the latter different from that cooperating with the first reading head so that a time delay is represented between the sections of said track being simultaneously read by said first and second heads, indicating means having two inputs sensitive to the readings derived by said heads and having a degree of inertia corresponding to the statistical factor to be determined, a first channel between said first head and one of said inputs for supplying the reading of said first head to said one input, and a second channel from said second head to the other of said inputs for supplying the reading of said second head to said other input.

7. A device for analysing the recording of a phenomenon to determine a statistical factor relating to said phenomenon; said device comprising a recording wire, means for continuously moving said recording wire, a first stationary reading head in reading cooperation with said wire, a second stationary reading head in reading cooperation with said wire at a location spaced along the wire from said first reading head so that a time delay is represented between the portions of said wire being simultaneously read by said first and second heads, indicating means having two inputs sensitive to the readings derived by said heads and having a degree of inertia corresponding to the statistical factor to be determined, a first channel between said first head and one of said inputs for supplying the reading of said first head to said one input, and a second channel from said second head to the other of said inputs for supplying the reading of said second head to said other input.

8. A device according to claim 7; further comprising means for adjusting the relative positions of said two stationary reading heads along the recording wire.

9. A device for determining the correlation coefficient deferred in time relating to a quantity varying at random in accordance with an associated phenomenon; said device comprising a recording support, a density recording of said quantity on said support, means for continuously moving said support, a first stationary reading head cooperating with recording, a second stationary reading head cooperating with said recording at a location spaced along the latter from said first head so that the portions of said recording read simultaneously by said heads are deferred in time with respect to each other, and damped wattmeter means having two inputs one of which is connected to said first reading head and the other of which is connected to said second reading head.

References Cited in the file of this patent

UNITED STATES PATENTS

| Number | Name | Date |
|---|---|---|
| 1,764,340 | Oman | June 17, 1930 |
| 2,243,730 | Ellis | May 27, 1941 |
| 2,258,859 | Mitelman | Oct. 14, 1941 |
| 2,277,285 | Woodling | Mar. 24, 1942 |
| 2,319,219 | Draper et al. | May 18, 1943 |
| 2,332,797 | Hume | Oct. 26, 1943 |
| 2,354,176 | Goldsmith | July 18, 1944 |
| 2,378,383 | Arndt | June 19, 1945 |
| 2,378,388 | Begun | June 19, 1945 |
| 2,389,861 | Macomber | Nov. 27, 1945 |
| 2,424,218 | Begun | July 22, 1947 |
| 2,442,383 | Stewart et al. | June 1, 1948 |

FOREIGN PATENTS

| Number | Country | Date |
|---|---|---|
| 612,618 | Germany | Apr. 29, 1935 |
| 924,800 | France | Mar. 17, 1947 |